United States Patent [19]

Planeta

[11] Patent Number: 4,929,162

[45] Date of Patent: May 29, 1990

[54] AIR RINGS FOR PRODUCTION OF BLOWN PLASTIC FILM

[76] Inventor: Mirek Planeta, 228 McCraney St., West, Oakville, Ontario, Canada, L6H 1H7

[21] Appl. No.: 321,260

[22] Filed: Mar. 9, 1989

[51] Int. Cl.$^5$ .............................................. B29C 47/88
[52] U.S. Cl. ................................... 425/72.1; 264/565; 264/568; 425/326.1; 425/388
[58] Field of Search ................ 425/72.1, 326.1, 387.1, 425/325, 388; 264/565, 566, 567, 569, 563, 564, 568

[56] References Cited

U.S. PATENT DOCUMENTS

| | | | |
|---|---|---|---|
| 3,548,042 | 12/1970 | Hinrichs | 425/72.1 X |
| 3,775,523 | 11/1973 | Haley | 425/72.1 X |
| 3,819,790 | 6/1974 | North et al. | 425/72.1 X |
| 3,888,609 | 6/1975 | Saint Eve et al. | 425/72.1 |
| 4,069,292 | 1/1978 | Herrington et al. | 425/326.1 X |
| 4,139,338 | 2/1979 | Cole | 264/565 X |
| 4,209,475 | 6/1980 | Herrington et al. | 425/72.1 X |
| 4,399,094 | 8/1983 | Fujitani et al. | 264/566 |
| 4,717,323 | 1/1988 | Karl et al. | 425/387.1 X |

Primary Examiner—Richard L. Chiesa

[57] ABSTRACT

The invention provides a new air ring of single or dual orifice type for use as a primary or secondary ring to cool a blown extruded tube of molten plastic material, and also to stabilize the moving tube. The air from the ring is kept in contact with the tube outer surface as much as possible by a chamber surrounding the tube. Maximum cooling requires maximum air velocity and in prior art apparatus this may then cause generation of vibrations of the bubble, resulting in non-uniform film, or even disruption of the bubble. The air volume and velocity must therefore be restricted to ensure that this does not happen. In the new air rings the side wall of the chamber diverges outwards in the direction of bubble movement with an end wall closing the downstream of the chamber and forming a short narrow orifice. The chamber is provided with a plurality of thin annular partition members which extend radially inwards so that their inner edges are close to the bubble wall to provide respective short, narrow gaps. Each adjacent pair of partitions forms a small annular chamber, and the endmost partitions form similar small annular chambers with the end walls. The air in these chambers is turbulent and disrupts the laminar flow of air over the bubble wall to increase its cooling effect. In addition a vacuum is formed in each chamber so that this part of the bubble wall is held by a series of small successive vacuums instead of a single vacuum, increasing its stability and permitting higher speed operation.

6 Claims, 1 Drawing Sheet

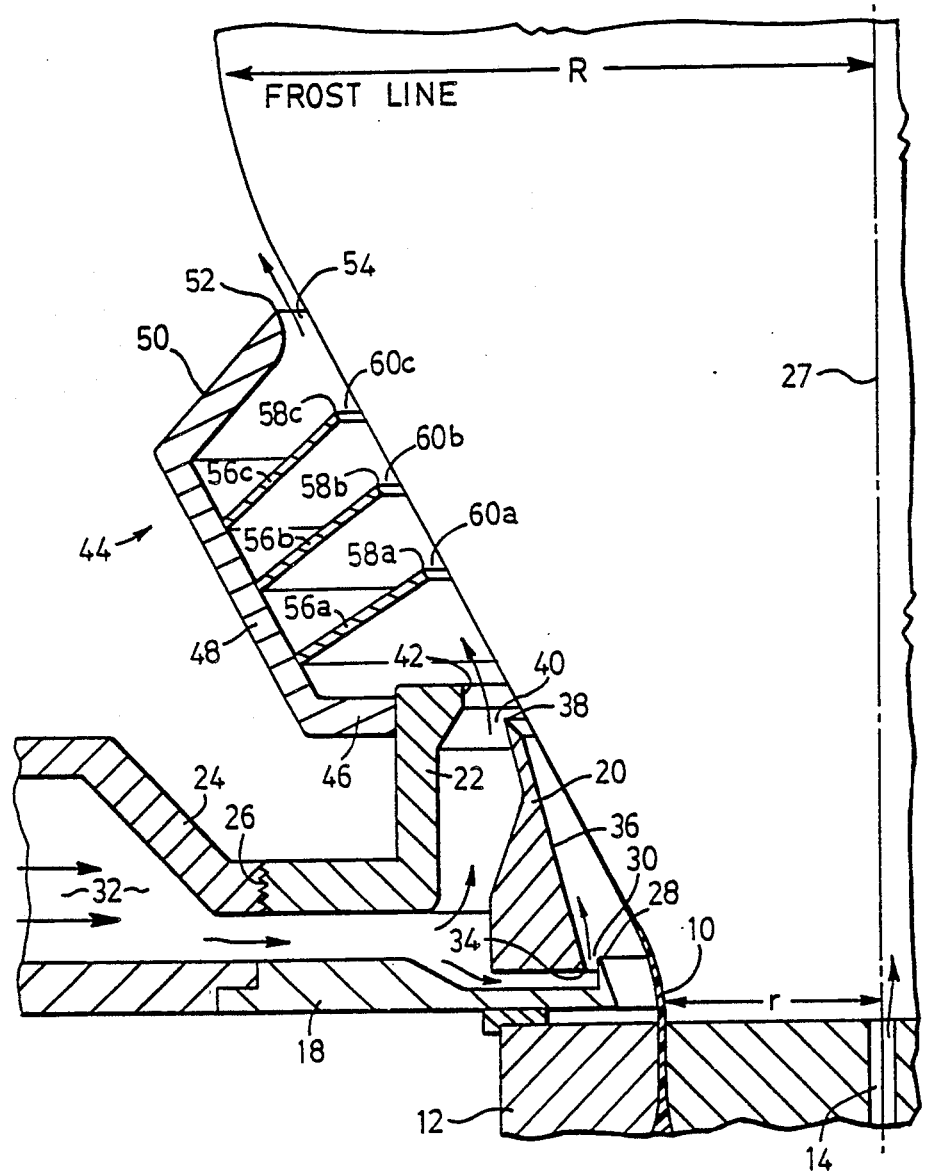

AIR RINGS FOR PRODUCTION OF BLOWN PLASTIC FILM

FIELD OF THE INVENTION

The present invention is concerned with improvements in or relating to air rings of the type that are employed in apparatus for the production of blown plastic film by extruding a tube thereof, and then expanding the tube to form a bubble by internal air pressure to a larger diameter, the ring being disposed around the tube of molten material in order to cool it.

REVIEW OF THE PRIOR ART

It is now virtually standard practice in apparatus for the production of blown plastic film to provide an air ring immediately adjacent to the outlet of the die from which the extruded tube of molten plastic emerges, the ring delivering an annular stream of cooling air against the outside surface of the tube. At this point the plastic material is hottest and therefore this is the most fragile part of the tube, and this factor severely limits the velocity and quantity of the air that can be discharged by the ring against the tube.

Rapid cooling of the tube is important to achieve the highest possible production, but must be secondary to maintaining a smoothly-moving tube that is as stable as possible, and does not wobble or oscillate in its path to the gathering station at which it is flattened and rolled, since such instability results in non-uniformity of the tube wall thickness and of the resultant film, and can be sufficient to disrupt the bubble, so that the apparatus must be stopped and re-started, with consequent loss of production. It will be understood therefore that it is the total production rate of acceptable film that is of importance for profitable operation, and a high instantaneous rate is not effective if too much of the film produced must be scrapped because of defects caused by oscillation, and/or the process is subject to frequent stoppages because of disruption of the tube.

One type of such cooling ring that has been used hitherto is known as a dual-orifice, venturi-type ring, as disclosed for example in prior U.S. Pat. No. 4,139,338, issued Feb. 13, 1979, the disclosure of which is incorporated by this reference. These rings have a first smaller annular orifice that discharges a corresponding first minor upstream airstream, and a second larger annular orifice that discharges a second major downstream airstream. The second stream is directed radially outward from the tube, creating a venturi effect that urges the tube outwards towards the ring, thereby stabilising it and permitting an increase in the amount and velocity of the air in the second stream, with consequent increase in cooling. The first stream provides some initial cooling but, more importantly, in passing between the tube and the adjacent ring structure, maintains an annular film of air between the ring structure and the tube that facilitates the smooth passage of the tube through the ring, and ensures that it cannot contact the ring structure and become disrupted. Typically such air rings consist of a lower lip member, an intermediate deflector member, and an upper lip member, the first airstream outlet being between the lower lip and deflector members, and the second airstream outlet being between the deflector and upper lip members. The deflector member is relatively short in height, usually of the order of 2.5 to 5 cm (1 to 2 in.) and its surface facing the tube wall increases progressively in diameter in the direction of movement of the tube.

Because of the short height of the deflector member the air emerging from the ring escapes relatively quickly away from the surface of the moving tube, and in order to increase the cooling effect of the second air stream it is common to provide a "chimney" surrounding the tube to form a narrow annular passage through which the air from both streams passes, so that it is constrained to stay close to the tube surface. The chimney often terminates in an iris at or just beyond the point at which the tube has expanded, the radially inner edge of the iris extending close to the exterior surface of the tube to form an annular gap of predetermined width at what is called the pinch point. The iris can be of fixed diameter if the system is always used with the same or sufficiently similar materials, but otherwise it may be necessary to make it variable in diameter so as to achieve a gap of the necessary dimension. The provision of this narrow passage and narrower exit gap at the pinch point means that the velocity of the air passing through them is increased, and this is accompanied by a corresponding considerable increase in the vacuum force within the passage and at the pinch point pulling the film radially outwards. The chimney is made as high as possible to increase the cooling effect, which can also be increased by increasing the volume of air, which will also result in an increase in the air velocity, again accompanied by an increase in vacuum.

Such systems have an inherent tendency to be unstable since, as the annular gap between the chimney and the tube becomes narrower, the force of the vacuum pulling the tube radially outwards becomes stronger; at the same time as the gap narrows the same volume of air must pass through the narrowed gap and the resultant radially inwardly acting force of the more compressed air increases and opposes the force of the vaccuum; unless care is taken the balance between the two forces shifts continuously with resultant oscillation. There is therefore a practical upper limit to the velocity employed because in practice an increase beyond this limit makes the bubble sufficiently unstable that it vibrates and wobbles, and this may become sufficiently strong to disrupt it.

There is disclosed and claimed in my prior Pat. No. 4,826,414 an air ring provided with a vacuum chamber forming member extending beyond the upper lip member and surrounding the respective portion of the tube beyond the upper lip member, the member having a outwardly diverging side wall spaced a minimum predetermined distance along its length from the tube surface, and an end wall having a radially inner edge of relatively small dimension forming a narrow annular gap between itself and tube outer surface whereby a vacuum is produced in the vacuum chamber urging the wall of the tube radially outward as the result of the cooling air exiting through the said annular gap.

This chamber forming member has at least one opening in a wall thereof through which air enters the vacuum chamber to reduce the vacuum and thereby reduce the vacumm force exerted on the tube. Adjustment of this opening or openings permits control of the vacuum to obtain extra speed of movement of the air without corresponding instability.

DEFINITION OF THE INVENTION

It is therefore a principal object of the invention to provide a new air ring for supplying cooling air to an extruded tube of plastics material, which provides the possibility of higher velocity for the cooling air and resultant increased cooling and production.

In accordance with the present invention there is provided a new air ring for the supply of cooling air to the exterior surface of an extruded tube of molten plastics material as it moves in a corresponding path of movement having a longitudinal axis, the ring comprising:

an annular bottom member, and an annular top member, each having an opening therein of circular cross-section concentric with the tube path axis for the passage therethrough of the extruded tube moving in the said path;

the bottom member providing the radially inner lip of an orifice discharging an annular stream of air against the tube outer surface and in the same direction as that of the tube movement, and the top member providing the radially outer lip of the said orifice; and an annular chamber forming member connected with and extending beyond the top member in the direction of tube movement;

the chamber forming member comprising a chamber forming side wall portion that diverges radially outwardly so as to be spaced a minimum predetermined distance along its entire length from the tube surface, and having in its interior a plurality of inwardly-extending, longitudinally-spaced partition members, each partition member extending from the side wall portion toward the tube surface, and each having a radially inner edge of relatively small dimension in the direction of tube movement adapted to be disposed adjacent the outer surface of the tube to form a respective annular gap between itself and the tube outer surface of radial dimension smaller than said minimum predetermined distance;

each partition member forming between itself and the immediately adjacent partition member, or between itself and an immediately adjacent radially inwardly extending portion of the chamber forming member, a respective minor turbulence-producing chamber in which the air flow is turbulent to disrupt laminar flow of air over the adjacent portion of the tube outer wall;

each turbulence producing chamber also having produced therein by the passage of the air past the succeeding partition member radially inner edge a respective vacuum urging the tube radially outward toward the edge.

DESCRIPTION OF THE DRAWINGS

An air ring which is a particular preferred embodiment of the invention will now be described, by way of example, with reference to the accompanying diagrammatic drawing, which is a half longitudinal cross-section through the ring.

DESCRIPTION OF THE PREFERRED EMBODIMENT

A tube 10 of molten plastics material issues from a die 12 and passes upwards to sizing, collapsing and gathering apparatus of any suitable type, not shown herein. In known manner air under pressure is supplied to the interior of the tube via an inlet such as a pipe 14. As long as the material is relatively molten the tube stays at its smaller radius r at which it was extruded from the die; as the material begins to solidify it also expands until at or about the frost line 16 it is at its maximum radius R, the ratio R/r being referred to as the blow-up ratio. The figure illustrates a typical shape for this lower part of the bubble. A dual-orifice air ring of the invention consists of a bottom lip member 18, an intermediate deflector member 20, and a top lip member 22, the top lip member being mounted on a support member 24 by a screw-thread connection at 26 to permit a small amount of vertical adjustment. All of these members are of annular form and are provided with respective central openings through which the tube moves, the openings being of circular cross-section coaxial with longitudinal axis 27 of the die, this axis being coincident with that of the extruded tube 10, and therefore also coincident with that of the path of movement of the tube.

The lower lip member 18 is mounted to be as close as possible to the upper horizontal surface of the die 12 and forms at 28 the radially inner lip of an first smaller annular orifice 30 that is supplied with air from an annular plenum chamber 32. The means by which air under pressure is supplied to the plenum chamber 32 will be apparent to those skilled in this art, and do not need illustration herein. The upstream portion of the deflector member 20 (the lower end as seen in the figures) extends close to the lower member 18 to provide at 34 the radially outer lip of the orifice 30. The inner surface 36 of the deflector member tapers outwards uniformly and progressively downstream, and the air from the orifice 30 moves between the outer surface of the tube and deflector surface 34 in the form of a thin annular stream to ensure that the bubble cannot touch that surface and become damaged or disrupted.

The downstream portion of the deflector member 20 provides at 38 the radially-inner lip of a second larger orifice 40, also supplied with air from plenum 32, while the adjacent portion of the upper member 22 provides at 42 the radially outer lip of this second orifice, which is formed between two facing surfaces of the two members and is shaped so that the emerging annular air stream is directed substantially parallel to the tube wall, so that a venturi effect occurs at the orifice 40, producing a vacuum at this point that urges this portion of the tube 14 to move outwards towards the surface 36 of the deflector member 20. As described above, contact with the deflector member is prevented by the interposed first air stream, and this portion of the tube is therefore effectively locked firmly in position relative to the deflector member.

A chamber-forming member, indicated generally by the reference 44, is mounted on the upper member 22 and has a short lower end wall portion 46 extending transversely of the tube axis 27. This portion 46 is connected to a much longer tubular side wall portion 48 which tapers or diverges progressively radially-outwardly and also extends in the direction of tube movement. The wall of the member 44 is completed by an upper end wall portion 50, which extends both radially inwards towards the tube wall transversely of the longitudinal axis 27, and in the direction of tube movement, the circular free edge 52 of this wall portion 50 being spaced from the tube outer surface to provide an annular orifice 54 of relatively much smaller radial dimension, through which the air from the two orifices 30 and 40 escapes to the ambient atmosphere.

In accordance with the invention the interior of the member 44 is provided with a plurality, three in this embodiment, of parallel uniformly-longitudinally-spaced, annular, inwardly-extending, thin partition members 56a, 56b and 56c. Each partition member has a respective radially inner edge 58a, 58b and 58c which, because the partition members are thin, is of relatively small dimension in the direction of tube movement. The partition members form respective short annular gaps 60a, 60b and 60c between their edges and the projected path of the tube that are approximately equal to one another. The partition members form between themselves and the end wall portions 46 and 50 respective minor chambers in which the air is inherently very turbulent, to the extent that it disrupts the laminar flow of the air close to the bubble surface and makes it much more effective in cooling in this early part of the bubble travel.

A vacuum is also established in each minor chamber that urges the wall of the tube radially outward, this outward urge being countered by the force of the air passing through the succession of narrow gaps 60c, 60b and 60a. This portion of the tube is therefore held firmly in the chamber-forming member by this plurality of small minor turbulent vacuums, which avoid the difficulty of a large single vacuum of the bubble becoming unstable as described above.

It is now found that it is possible to increase the air flow from the second orifice 40, causing a corresponding increase in the air velocity and its cooling effect, without corresponding increases in the vacuum force in the chamber above an unacceptable level, and without maintenance of the laminar flow that tends to shield the bubble wall from the cooling effect of the air. The air flow from the first orifice may or may not also be increased, since the primary purpose of this air flow is to prevent contact of the bubble with the deflector 20 under the urging of the vacuum force. A skilled operator can observe the bubble as it emerges from the ring and detect by eye whether or not it is beginning to oscillate and adjust the extruding speed and air flow accordingly. The observation of the bubble can be facilitated by making the wall portion 48 of a suitable transparent material, such as transparent methyl methacrylate resin.

The replacement installation of a chamber-forming member of the invention on an air ring is found to permit a very substantial increase in the output of film from the extruder system. For example, when an experimental test was carried out on a 20 cm (8 ins) diameter die of height 20 cm (8 ins) using linear low density polyethylene resin (LLPDE), it proved possible to increase the speed of the extruder from about 70 rpm to 130 rpm., corresponding to an increase in output of 86%. The chamber-forming member is designed specifically for the bubble size and blow-up ratio with which it is to be used, but this is not a substantial disadvantage, since many systems are used only for one type of polymer, and adaption for another system involves only changing the chamber forming member.

The number of partitions provided and their longitudinal spacing depends primarily upon the melt strength, the number increasing and the spacing decreasing as the melt strength decreases. The minimum practical spacing is 2.5 cm (1 in) and a more usual value is 5.0 cm (2 ins). Preferably, the partitions are disposed so that their planes are approximately at ninety degrees to the immediately adjacent part of the tube wall, but such a perpendicular orientation is not essential and the angle can vary plus or minus thirty degrees from the perpendicular.

It is important for implementation of the invention that the distance between the radially inner surface of the wall portion 48 and the outer surface of the bubble does not decrease below a predetermined minimum value over the entire length of the wall portion and, in view of the progressive radial expansion of the bubble, the wall must diverge or taper radially outward in a corresponding manner in the direction of movement of the tube in order to maintain this minimum dimension. A strong vacuum force is present at the gap 54, and smaller vacuum forces are present at the other gaps, and lock the bubble in place, but since each gap is of relatively short dimension in the direction of tube movement, the possibility of bubble vibration and instability is correspondingly reduced. It is possible for the divergence of the inner surface of wall portion 48 to be progressively greater than that of the bubble, so that the minimum value of the wall spacing is exceeded more and more in the direction of tube movement; however there are practical limitations in that the chamber forming member may then extend out radially so far as to interfere with other parts of the ring, or prevent necessary access. Again it is possible for the wall and its surface to diverge initally to provide a distance that is much greater than the minimum value and then not diverge any further, perhaps becoming cylindrical and coaxial with the tube, or even to taper or converge somewhat radially inward, provided that along the entire length of the wall surface the distance is not smaller than the said predetermined minimum value. With a small ring, for use for example with a die of 15 cm (6 in) diameter, the minimum dimension will be about 2.5 cm (1 in), while with the larger rings it can be as much as about 10.0 cm (4 in). Theoretically it is desirable to make the distance as large as possible, and to increase it as the size of the ring increases, but there are practical limitations because of the resulting size and cost of the resulting air ring, especially if a high blow-up ratio is required.

Another advantage of the air rings of the invention is that the bubble is stabilized by being held by the controlled relatively "low-level" vacuums established in the plurality of chambers over a substantial length between the orifice 40 and the gap 54, while the stabilization by the much stronger vacuum at the gap 54 is particularly effective because the melt is cooler, and consequently the bubble wall stronger, so that it is able to withstand the short length stronger vacuum. The chamber also forms a chimney whose effective height is the distance between the radially inner lip 38 and edge 52 of the gap 54, and in practice this also should be as high as possible, so that the controlled stabilizing vacuums extend over as much of the length of the tube as possible. Besides the cost and size factors referred to above a practical limitation is also set, especially with dies and air rings of small diameters, in that the operator must be able conveniently to reach down into the air ring during start up to gather and raise the initial extruded blob of plastic material, in order to establish the bubble and start the line running, and also to clean the orifice lips from time to time, and these operations become too difficult if the structure is too high.

Although the invention has been described in association with a dual-orifice air ring, since this type is preferred in the industry, it is also applicable to single orifice air rings having the single orifice formed between an upper member and a lower member which provide the respective orifice lips. Moreover, although the invention has been described in relation to a primary air ring disposed immediately adjacent to the extrusion die 12, it will be apparent that the invention is also applicable to secondary rings spaced along the path of the tube.

I claim:

1. An air ring for the supply of cooling air to the exterior surface of an extruded tube of molten plastics material as it moves in a corresponding path of movement having a longitudinal axis, the ring comprising:

an annular bottom member, and an annular top member, each having an opening therein of circular cross-section concentric with the tube path axis for the passage therethrough of the extruded tube moving in the said path;

the bottom member providing the radially inner lip of an orifice discharging an annular stream of air against the tube outer surface and in the same direction as that of the tube movement, and the top member providing the radially outer lip of the said orifice; and an annular chamber forming member connected with and extending beyond the top member in the direction of tube movement;

the chamber forming member comprising a chamber forming lower end wall portion extending transversely of the longitudinal axis, a side wall portion that diverges progressively radially outwardly so as to be spaced a minimum predetermined distance along its entire length from the adjacent portion of the tube surface, and so as to conform in shape to the shape of the said adjacent portion of the tube surface, and an upper end wall portion that extends radially inwards transversely of the longitudinal axis; the chamber forming member having in its interior a plurality of longitudinally-spaced partition members each extending from the side wall portion toward the tube surface, the upper end wall portion and each partition member having a radially inner edge of relatively small dimension in the direction of tube movement adapted to be disposed adjacent the outer surface of the tube to form a respective annular gap between itself and the tube outer surface of radial dimension smaller than said minimum predetermined distance;

each partition member forming between itself and the immediately adjacent partition member, or between itself and the immediately adjacent radially inwardly extending lower end wall portion or upper end wall portion, a respective minor turbulence-producing chamber in which the air flow is turbulent to disrupt laminar flow of air over the adjacent portion of the tube outer wall;

each turbulence-producing chamber also having produced therein by the passage of the air past the succeeding partition member radially inner edge a respective vacuum urging the tube radially outward toward the edge.

2. An air ring as claimed in claim 1, wherein the partition members are parallel and uniformly longitudinally spaced from one another.

3. An air ring as claimed in claim 2, wherein at least part of the said chamber forming side wall portion is of transparent material in order to permit observation of the portion of the bubble wall within the chamber.

4. An air ring as claimed in claim 1, wherein the partition members are disposed to be perpendicular to the respective immediately adjacent portions of the tube wall.

5. An air ring as claimed in claim 1, wherein the partition members are oriented relative to the respective immediately adjacent portions of the tube wall to be up to thirty degrees on either side of the respective perpendiculars to the respective immediately adjacent portions of the tube wall.

6. An air ring as claimed in claim 1, wherein at least part of the said chamber forming side wall portion is of transparent material in order to permit observation of the portion of the bubble wall within the chamber.

* * * * *